United States Patent
Ham et al.

(10) Patent No.: US 12,222,597 B2
(45) Date of Patent: Feb. 11, 2025

(54) OPTICAL FILM AND ELECTRONIC DEVICE INCLUDING THE SAME

(71) Applicant: LMS Co., Ltd., Pyeongtaek-si (KR)

(72) Inventors: Moonho Ham, Pyeongtaek-si (KR); Janghee Cho, Pyeongtaek-si (KR); Jongmun Lee, Pyeongtaek-si (KR); Taegu Hwang, Pyeongtaek-si (KR); Wonhee Lee, Pyeongtaek-si (KR); Jinhwan Kim, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 0 days.

(21) Appl. No.: 18/336,653

(22) Filed: Jun. 16, 2023

(65) Prior Publication Data

US 2024/0069376 A1    Feb. 29, 2024

(30) Foreign Application Priority Data

Aug. 31, 2022 (KR) .................. 10-2022-0110231

(51) Int. Cl.
*G02F 1/1335* (2006.01)

(52) U.S. Cl.
CPC .. *G02F 1/133512* (2013.01); *G02F 1/133607* (2021.01)

(58) Field of Classification Search
CPC ......... G02F 1/133606; G02F 1/133607; G02F 1/133615; G02F 1/133524
USPC ........................................................ 349/65
See application file for complete search history.

(56) References Cited

U.S. PATENT DOCUMENTS

| 2013/0135750 A1 | 5/2013 | Walker, Jr. et al. |
| 2019/0310513 A1* | 10/2019 | Kashiwagi ............ G02F 1/1335 |
| 2020/0379162 A1* | 12/2020 | Chen .................... G02B 6/0053 |

FOREIGN PATENT DOCUMENTS

| EP | 3521872 A1 | 8/2019 |
| JP | 10-289604 A | 10/1998 |
| JP | 2006-119365 A | 5/2006 |
| JP | 2007-279424 A | 10/2007 |
| JP | 2014-071148 A | 4/2014 |
| JP | 2014-186241 A | 10/2014 |
| JP | 2016-033663 A | 3/2016 |
| JP | 2017-167506 A | 9/2017 |
| JP | 2017-203979 A | 11/2017 |
| KR | 10-2016-0128801 A | 11/2016 |
| TW | 202016576 A | 5/2020 |

* cited by examiner

*Primary Examiner* — Dung T Nguyen
*Assistant Examiner* — David Y Chung
(74) *Attorney, Agent, or Firm* — NKL LAW; Jae Youn Kim (57) ABSTRACT

An optical film is provided. The optical film includes a mat layer including a plurality of protrusions, a first base film disposed under the mat layer, a light blocking pattern layer disposed under the first base film and including a plurality of light absorption patterns arranged in a first direction, an adhesive layer disposed under the light blocking pattern layer, a second base film attached to the light blocking pattern layer using the adhesive layer, and a prism structure disposed under the second base film where the prism structure includes a plurality of prisms arranged along a second direction inclined at 80° to 100° with respect to the first direction.

7 Claims, 10 Drawing Sheets

Prior Art

FIG. 4

| Configuration | | 320 | 300 | 100 |
|---|---|---|---|---|
| Con. | |  |  |  |
| Brightness [≥70%] | | 100% | 78% | 95% |
| FWHM(°) | | 19 / 41 | 19 / 34 | 17 / 34 |
| Cut-off [≤0.2%] | 45° | 8.4% | 0.4% | 0.4% |
| | -45° | 5.7% | 0.3% | 0.3% |
| Thickness (Target : 400μm) | Louver | - | 300μm | 270μm or 330μm |
| | Pev.Prism | 155μm | 155μm | |

FIG. 5

| Pitch Ratio (Louver/Prism) | 1.5 (27/18) | 1.75 (31.5/18) | 2.0 (36/18) | 2.15 (39/18) | 2.25 (41/18) | 2.5 (45/18) | 2.75 (50/18) |
|---|---|---|---|---|---|---|---|
| Brightness | 87% | 93% | 98% | 100% | 102% | 105% | 106% |
| FWHM | 11° | 13° | 14° | 15° | 16° | 16° | 17° |
| Image | | | | | | | |
| Light Path | | | | | | | |

| R.I. Ratio (Clear/Prism) | 0.94 (1.40/1.49) | 0.97 (1.45/1.49) | 1.01 (1.50/1.49) | 1.04 (1.55/1.49) | 1.07 (1.60/1.49) | 1.10 (1.65/1.49) |
|---|---|---|---|---|---|---|
| Brightness | 94% | 94% | 100% | 100% | 100% | 100% |
| FWHM | 12 | 13 | 13 | 15 | 16 | 16 |
| Image | | | | | | |
| Light Path | | | | | | |

OPTICAL FILM AND ELECTRONIC DEVICE INCLUDING THE SAME

CROSS-REFERENCE TO RELATED APPLICATION(S)

This application is based on and claims priority under 35 U.S.C. 119 to Korean Patent Application No. 10-2022-0110231, filed on Aug. 31, 2022, in the Korean Intellectual Property Office, the disclosure of which is herein incorporated by reference in its entirety.

TECHNICAL FIELD

The present invention is generally related to an optical film and an electronic device including the optical film.

BACKGROUND

Along with the development of the display, it is necessary to develop an optical film for the purpose of not disclosing information displayed on the display to others. For example, a display employed in an electronic device, particularly a small electronic device such as a smart phone, generally implements a wide viewing angle. Accordingly, unintentional exposure of important user information, such as payment information and health information, is problematic. In addition, the use of an in-vehicle display is increasing, and an optical film capable of controlling the viewing angle is being developed for the purpose of preventing a driver from viewing the displayed image while driving for the safety of the driver and passenger.

In general, an optical film is also called a light control film, a privacy film, or a viewing angle limiting film, and may refer to a film configured to vary light transmittance depending on an angle. Conventional optical films are being designed in various structures to realize a narrow viewing angle, but it is required to improve an optical film capable of avoiding problems such as a narrow viewing angle limitation, lowering of luminance, and moiré effect with better quality.

Thus, to reduce the viewing angle of the optical film, an optical film in which a plurality of optical sheets (e.g., two sheets) are laminated may be used. However, when an optical film including a plurality of laminated optical sheets is used, the thickness of the optical film is increased, and thus the brightness may be decreased because of the lowered transmittance of a louver film caused by the absorption layer of the louver film. Also, power consumption of a battery may be increased to compensate for the lowered brightness. Additionally, the assembly time of a back light module can be increased by stacking the optical sheets.

SUMMARY

According to various embodiments of the present invention, an optical film of one sheet can be realized with the lamination of a light-shielding pattern layer and a prism structure thereby easy assembly, a narrow viewing angle, high transmittance, and slimming of a backlight module can be realized.

According to various embodiments of the present invention, a brightness loss of light emitted from a light source can be minimized and a viewing angle of the optical film can be reduced by using an optical film including light absorption patterns and prisms arranged substantially perpendicular to each other.

According to various embodiments of the present disclosure, the optical film can implement a narrow viewing angle to protect user's privacy while maintaining the function of the display by effectively condensing light.

According to various embodiments of the present disclosure, an optical film may include a laminated light blocking pattern layer and a prism structure. With the lamination of the light blocking pattern layer and the prism structure, the brightness of the optical film may be increased, the viewing angle may be reduced, and the thickness of the optical film may be reduced.

According to an embodiment of the invention, there is provided that an optical film comprises a matte layer including a plurality of protrusions; a first base film disposed under the matte layer; a light blocking pattern layer disposed under the first base film and including a plurality of light absorption patterns arranged along a first direction; an adhesive layer disposed below the light blocking pattern layer; a second base film attached to the light blocking pattern layer using the adhesive layer; and a prism structure disposed under the second base film where the prism structure includes a plurality of prisms arranged along a second direction inclined at 80° to 100° with respect to the first direction.

In an embodiment, the optical film in the present invention includes the light blocking pattern layer where a first surface facing the first base film and a second surface opposite to the first surface and facing the adhesive layer and the light absorption pattern includes an upper surface facing the first surface, a lower surface disposed on the second surface, and a side surface extending from the lower surface to the upper surface where the area of the upper surface is smaller than the area of the lower surface of the optical film.

In an embodiment, the light absorption pattern of the optical film in the present invention includes an angle between the side surface and the lower surface is 85° to 90°.

In an embodiment, the light absorption pattern of the optical film in the present invention includes the upper surface of the optical film being spaced apart from the first surface.

In an embodiment, the optical film in the present invention includes the first pitch of the plurality of light absorption patterns being 2 to 2.5 times of the second pitch of the plurality of prisms.

In an embodiment, the optical film in the present invention includes the plurality of light absorption patterns being configured to reduce a viewing angle in the second direction and the plurality of prisms being configured to reduce a viewing angle in the first direction.

In an embodiment, the optical film in the present invention includes each of the plurality of light absorption patterns being a trapezoidal wedge shape.

In an embodiment, the optical film in the present invention includes the plurality of light absorption patterns being arranged parallel to each other and spaced apart from each other.

In an embodiment, the optical film in the present invention includes the light blocking pattern layer with a light transmitting area positioned between the plurality of light absorption patterns.

The problem to be solved in the present disclosure is not limited to the above-mentioned problem, and it may be expanded in various ways without departing from the spirit and scope of the present disclosure.

In addition, various effects identified directly or indirectly in the present invention may be provided.

DETAILED DESCRIPTION

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., a module or a program) of the above-described components may include a singular or a plurality of entities, and some of the plurality of entities may be separately disposed in other components. According to various embodiments, one or more components or operations among the above-described corresponding components may be omitted, or one or more other components or operations may be added. Alternatively, or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, the function performed by a module, program, or other component are executed sequentially, in parallel, iteratively, or heuristically, or one or more of the actions are executed in a different order or are omitted, or one or more other actions may be added.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

Figure 1:
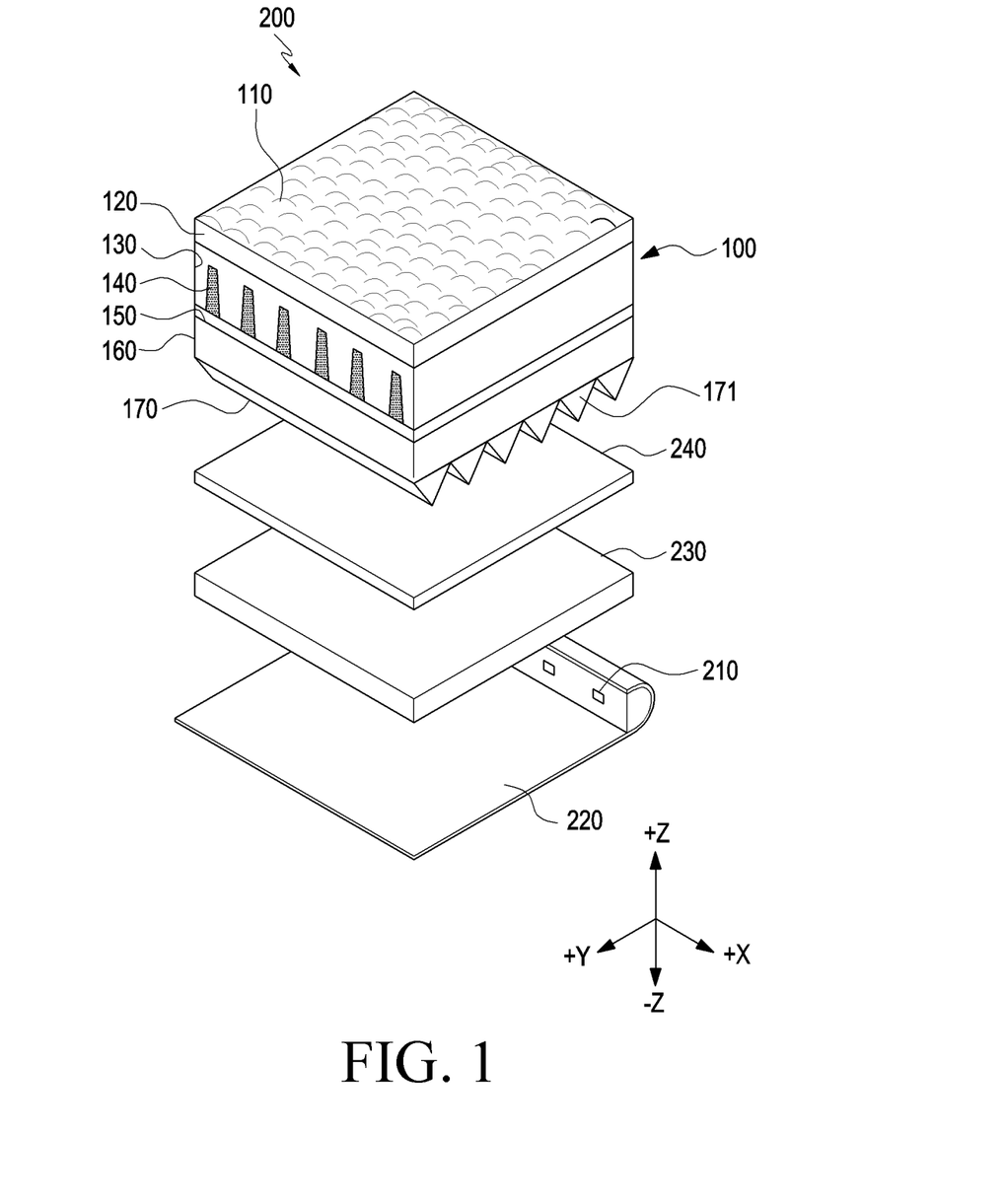
FIG. 1 is an exploded perspective view of a backlight unit according to an embodiment of the present invention.

FIG. 1 is an exploded perspective view of a backlight unit according to an exemplary embodiment of the present invention.

In general, a liquid crystal display device includes a backlight unit 200 that provides uniform light to the entire screen unlike a conventional cathode ray tube (CRT). The backlight unit 200 may be provided behind the liquid crystal panel to radiate light to the liquid crystal panel. The backlight unit 200 may include a light source 210, a reflector 220, a light guide plate 230, a diffusion sheet 240 and/or an optical film 100.

According to various embodiments, the light source 210 may emit light. The light source 210 may include a light emitting unit that emits light. The light source 210 may emit light from a side of the light guide plate 230 (e.g., an X-axis direction and/or a Y-axis direction) and transmit light toward the light guide plate 230. As the light emitted from the light source 210 is irradiated to the rear surface of the liquid crystal panel, an identifiable image may be implemented.

According to an embodiment, the light source 210 may contain one of a cold cathode fluorescent lamp (CCFL), an external electrode fluorescent lamp (external electrode fluorescent lamp), and a light emitting diode (LED, hereinafter referred to as LED). According to an embodiment, the light source 210 is divided into an edge type and a direct type according to the arrangement configuration. The direct type is capable of split driving compared to the edge type, and thus it can implement more delicate images than the edge type.

According to an embodiment, the reflector 220 is disposed at the rear of the light guide plate 230, and thus it reflects the light emitted from the rear of the light guide plate 230 and then the reflected light is incident to the light guide plate 230 to reduce light loss.

According to an embodiment, the light guide plate 230 may transform light incident from the light source 210 into a surface light source.

According to one embodiment, the diffusion sheet 240 can uniformly disperse the light incident from the light guide plate 230. For example, the diffusion sheet 240 may cause light diffusion by light diffusion beads created by depositing a solution made of a curable resin (e.g., one or combination of at least one or more selected from urethane acrylate, epoxy acrylate, ester acrylate, and a radical generating monomer) with light diffusing agent beads added. For another example, the diffusion sheet 240 may have uniform or non-uniformly sized (e.g., spherical) protrusion patterns (or protrusions) to promote light diffusion.

According to an embodiment, the optical film 100 may include a matte layer 110 including a plurality of protrusions 111, a first base film 120 disposed under the matte layer 110 and a light blocking pattern layer 130 disposed under the first base film 120 and including a plurality of light absorption patterns 140, an adhesive layer 150 disposed under the light blocking pattern layer 130, and a second base film 160 disposed under the adhesive layer 150, a prism structure 170 disposed under the second base film 160 and including a plurality of prisms 171.

According to an embodiment, the optical film 100 may include a mat layer 110 including a plurality of protrusions 111, a first base film 120 disposed under the mat layer 110 and a light blocking pattern layer 130 disposed under the first base film 120 and including a plurality of light absorption patterns 140, an adhesive layer 150 disposed under the light blocking pattern layer 130, and a second base film 160 disposed under the adhesive layer 150, a prism structure 170 disposed under the second base film 160 and including a plurality of prisms 171.

According to an embodiment, the optical film 100 may condense at least a portion of light generated from the light source 210. For example, the optical film 100 may reduce the viewing angle of the display device by condensing light heading in left and right directions (e.g., X-Y plane directions) toward a central direction (e.g., +Z direction). According to one embodiment, the optical film 100 may be referred to as a light control film.

A plurality of components included in the above-described backlight unit 200 may be combined in various ways. For example, in the backlight unit 200, some of the light source 210, the reflector 220, the light guide plate 230, and the diffusion sheet 240 may be omitted, the arrangement order of the components may be different, or additional components may be further included. For example, a diffusion sheet may be further included between the optical film 100 of the backlight unit 200 and the reflective polarizing sheet 16. For another example, some components (e.g., the diffusion sheet 240) of the backlight unit 200 may be excluded.

According to one embodiment, the backlight unit 200 may be assembled with an LCD panel (not shown) and provided for a display device.

Figure 2:
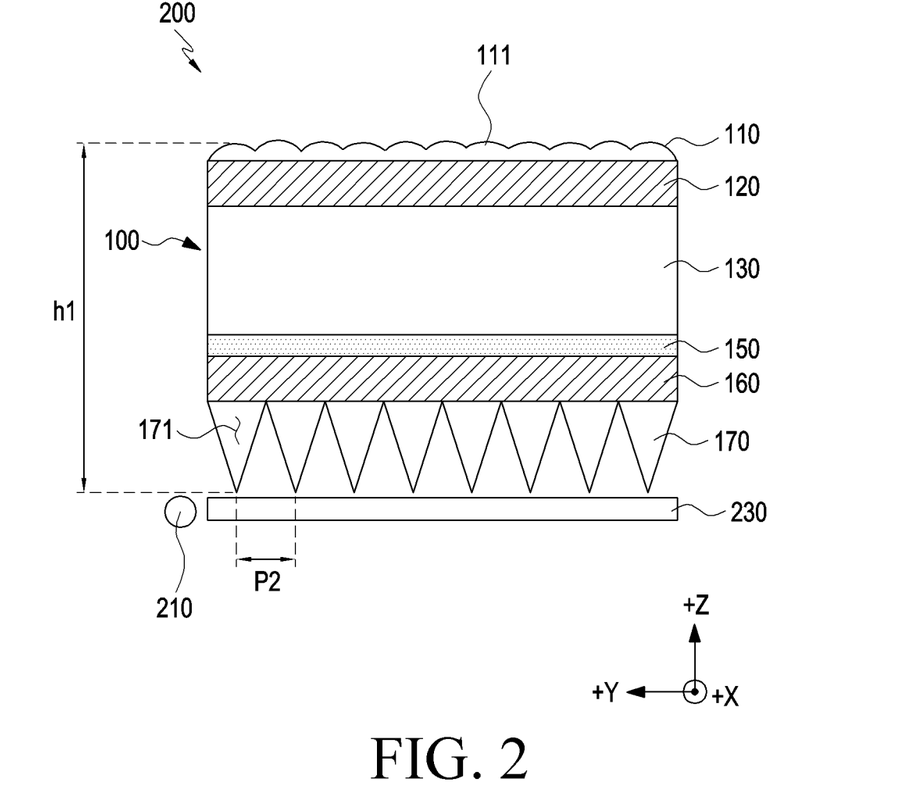
FIG. 2 is a side view of a backlight unit according to an embodiment of the present invention.
Figure 3:
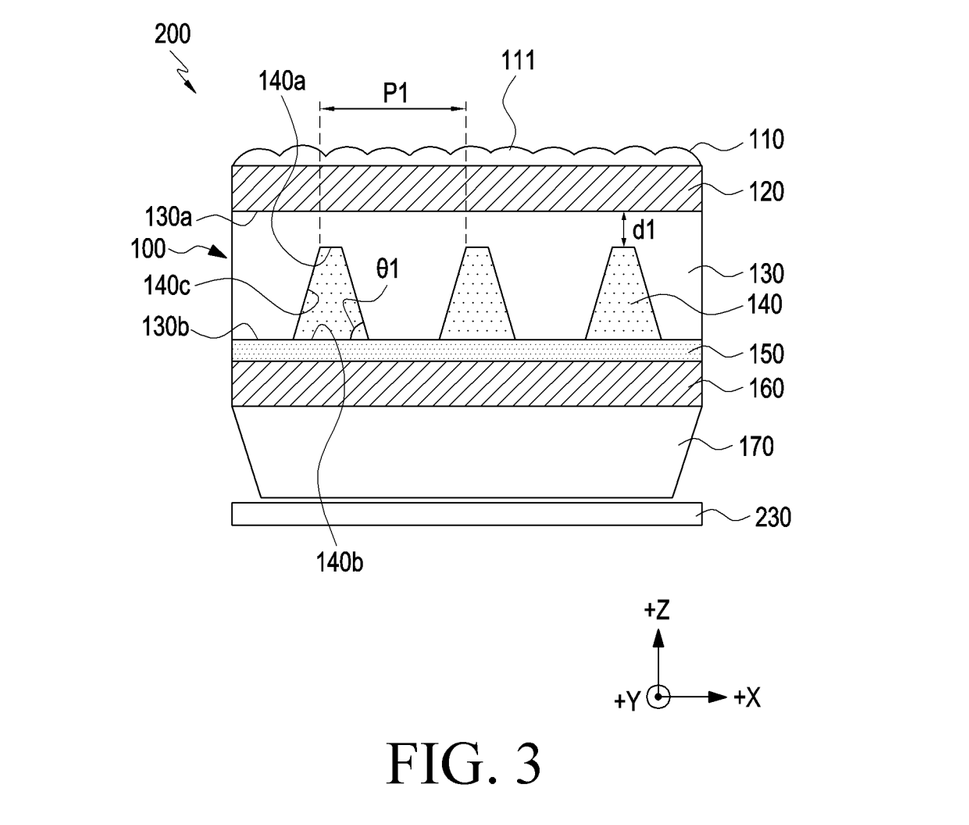
FIG. 3 is a front view of a backlight unit according to an embodiment of the present invention.

FIG. 2 is a side view of a backlight unit according to an embodiment of the present invention. FIG. 3 is a front view of a backlight unit according to an embodiment of the present invention.

Referring to FIGS. 2 and 3, a backlight unit 200 may include an optical film 100, a light source 210 and a light guide plate 230. The optical film 100 may include a matte layer 110, a first base film 120, a light blocking pattern layer 130, an adhesive layer 150, a second base film 160, and a prism structure 170. The configurations of the optical film 100 and the backlight unit 200 of FIGS. 2 and 3 may be the same as entire or part of the configurations of the optical film 100 and the backlight unit 200 of FIG. 1.

According to various embodiments, the matte layer 110 may reduce a viewing angle of light passing through the matte layer 110. For example, the matte layer 110 may include a plurality of protrusions 111 directed in the third direction (+Z-axis direction) to form a narrow viewing angle. According to one embodiment, the matte layer 110 may be disposed on the first base film 120. According to one embodiment, the plurality of protrusions 111 of the matte layer 110 may enhance external shielding of the optical film 100 and reduce moiré visibility.

According to various embodiments, the matte layer 110 may implement a scattering effect with surface protrusions of a non-bead type. For example, the matte layer 110 may be implemented by designing a plurality of protrusions on the surface for forming the matte layer through a mold process and then replicating the protrusion shape using a UV resin.

According to various embodiments, the first base film 120 may support the matte layer 110. According to one embodiment, the first base film 120 may be disposed between the matte layer 110 and the light blocking pattern layer 130. According to one embodiment, the first base film 120 may be formed of a material capable of transmitting at least a portion of visible light. According to an embodiment, the first base film 120 may include at least one of polymer resins such as polycarbonate (PC), acrylate, and polyethylene terephthalate (PET). According to one embodiment, the first base film 120 may be referred to as a first light-transmitting layer.

According to various embodiments, the light blocking pattern layer 130 may include a plurality of light absorption patterns 140. According to an embodiment, the light absorption pattern 140 may include a material capable of absorbing at least a portion of light. For example, the light absorption pattern 140 may be at least one of materials capable of absorbing light, such as carbon nanotubes (CNT), graphene, or carbon black. According to an embodiment, the light blocking pattern layer 130 may be referred to as a louver film or a microlouver film. For example, the light blocking pattern layer 130 may include a plurality of light absorption patterns 140 and a light transmission area 131 positioned between the plurality of light absorption patterns 140. The plurality of light absorption patterns 140 and the light transmission area 131 may be substantially alternately arranged.

According to one embodiment, the light blocking pattern layer 130 may be disposed between the first base film 120 and the adhesive layer 150. For example, the light blocking pattern layer 130 may include a first surface 130a facing the first base film 120 and a second surface 130b opposite to the first surface 130a and facing the adhesive layer 150.

According to various embodiments, the plurality of light absorption patterns 140 may be placed side by side in a shape corresponding to each other. For example, the light absorption pattern 140 may extend along the first direction (e.g., the Y-axis direction). A structure in which the light absorption pattern 140 extends along the first direction may be interpreted as a structure in which one light absorption pattern 140 is arranged substantially parallel to the first direction.

According to an embodiment, the light absorption pattern 140 may be disposed on the second surface 130b. For example, the light absorption pattern 140 may include an upper surface 140a facing the first surface 130a, a lower surface 140b disposed on the second surface 130b and a side surface 140c extended from the lower surface 140b to the upper surface 140a.

According to various embodiments, the light absorption pattern 140 may have a substantially trapezoidal wedge shape. According to an embodiment, a cross-sectional area of the light absorption pattern 140 in a width direction (e.g., an X-Y plane) may have a shape that gradually decreases in the +Z direction. For example, the first angle θ1 between the side surface 140c and the lower surface 140b of the light absorption pattern 140 may be 85° to 90°. The area of the lower surface 140b of the light absorption pattern 140 may be larger than the area of the upper surface 140a. When the area of the lower surface 140b of the light absorption pattern 140 is larger than the area of the upper surface 140a, moire and light interference may be reduced.

According to various embodiments, the top surface 140a of the light absorption pattern 140 may be spaced apart from the first surface 130a of the light blocking pattern layer 130. Since the light absorption pattern 140 is spaced apart from the first surface 130a of the light blocking pattern layer 130, the luminance of the cut-off viewing angle may be controlled and an improved optical film 100 may be provided. According to an embodiment, the first distance (d1) between the upper surface 140a of the light absorption pattern 140 and the first surface 130a of the light blocking pattern layer 130 can be designed to consider the amount of air bubbles generated and the amount of UV resin consumption during the manufacturing process of the optical film 100. For example, the first distance (d1) may be designed to be about 50 µm or less.

According to various embodiments, the plurality of light absorption patterns 140 may have a first pitch (P1). For example, a distance between peaks or upper surfaces 140a or a distance between valleys or lower surfaces 140b of the plurality of light absorption patterns 140 may be referred to as a first pitch (P1). According to an embodiment, the first pitch (P1) of the plurality of light absorption patterns 140 may be longer than the second pitch (P2) of the plurality of prisms 171. The relationship between the first pitch (P1) and the second pitch (P2) will be described in detail with reference to FIGS. 6 and 7. According to an embodiment, the light-blocking pattern layer 130 may include a light-transmitting area 131 through which light passes positioned between the plurality of light-absorption patterns 140.

According to various embodiments, the adhesive layer 150 may be positioned between the light blocking pattern layer 130 and the prism structure 170. For example, the adhesive layer 150 may connect or combine with the light blocking pattern layer 130 and the second base film 160. According to an embodiment, the adhesive layer 150 may support the plurality of light absorption patterns 140 of the light blocking pattern layer 130. According to an embodiment, the adhesive layer 150 can reduce light loss due to interfacial reflection by removing air gap between the light blocking pattern layer 130 and the second base film 160.

According to various embodiments, the second base film 160 may support the light blocking pattern layer 130. According to one embodiment, the second base film 160 may be disposed between the adhesive layer 150 and the prism structure 170. According to an embodiment, the second base film 160 may be formed of material capable of transmitting at least a portion of visible light. According to an embodiment, the second base film 160 may include at least one of polymer resins such as polycarbonate (PC), acrylate, and polyethylene terephthalate (PET). According to one embodiment, the second base film 160 may be referred to as a second light-transmitting layer.

According to various embodiments, the prism structure 170 may be disposed under the second base film 160 (e.g., in the −Z direction). According to one embodiment, the prism structure 170 may include a plurality of prisms 171.

According to various embodiments, the plurality of prisms 171 may be disposed side by side in a shape corresponding to each other. For example, the plurality of prisms 171 may be extended along one direction (e.g., the X-axis direction). According to one embodiment, the plurality of light absorption patterns 140 may be arranged to have a designated angle with respect to the plurality of prisms 171. For example, a first direction where a plurality of light absorption patterns are arranged may be inclined in a specified angular range with respect to a second direction where a plurality of prisms are arranged. According to one embodiment, the designated angular range may be 80° to 100°. According to one embodiment, the plurality of light absorption patterns 140 may be arranged along a direction substantially perpendicular to the plurality of prisms 171. For example, the plurality of light absorption patterns 140 may be arranged along a first direction (e.g., Y-axis direction) and the plurality of prisms 171 may be arranged in a direction perpendicular (e.g., X-axis direction) to the first direction (Y-axis direction). A structure where a plurality of prisms 171 are extended along the second direction may be interpreted as a structure where one prism 171 is substantially parallel to the second direction.

According to various embodiments, the plurality of prisms 171 may have a second pitch (P2). For example, a distance between peaks or valleys of the plurality of prisms 171 may be referred to as a second pitch (P2).

According to various embodiments, the plurality of light absorption patterns 140 may reduce a viewing angle in a left-right direction (eg, an X-axis direction). For example, the light blocking pattern layer 130 may condense at least a portion of light incident from below the light blocking pattern layer 130. In the present invention, focusing of light may be interpreted as condensing of light.

According to an embodiment, the plurality of prisms 171 may control a viewing angle in a vertical direction (e.g., a Y-axis direction). For example, the prism structure 170 may focus (e.g., condense) at least a portion of light incident from below the prism structure 170. A viewing angle of light passing through the optical film 100 may be reduced by the plurality of light absorption patterns 140 and the plurality of prisms 171. As the viewing angle is reduced, the risk of exposing of important information that a user of a small electronic device such as a smart phone does not want to expose can be reduced. According to an embodiment, the direction where the plurality of prisms 171 are arranged may be different from the direction where the light blocking pattern layer 130 is arranged. For example, the light blocking pattern layer 130 may be arranged along a first direction (Y-axis direction), and the plurality of prisms 171 may be arranged along a second direction substantially perpendicular to the first direction. For another example, the light blocking pattern layer 130 may be arranged along a first direction (e.g., the Y-axis direction) and the plurality of prisms 171 may be arranged along a second direction where the second direction is inclined at 80° to 100° with respect to the first direction. According to an embodiment, the optical film 100 may control viewing angles in all directions by using the light blocking pattern layer 130 and the plurality of prisms 171. For example, the light blocking pattern layer 130 can control a viewing angle in the left and right directions (e.g., reducing the viewing angle) by condensing light in a left and right direction (e.g., the second direction) and the plurality of prisms 171 can control a viewing angle in the upward direction by condensing light in the vertical direction (e.g., the first direction (Y-axis direction)). According to one embodiment, the light path of the optical film may be referred to as a 4-way structure that changes a viewing angle in a vertical direction and a viewing angle in a left-right direction.

Figure 4:
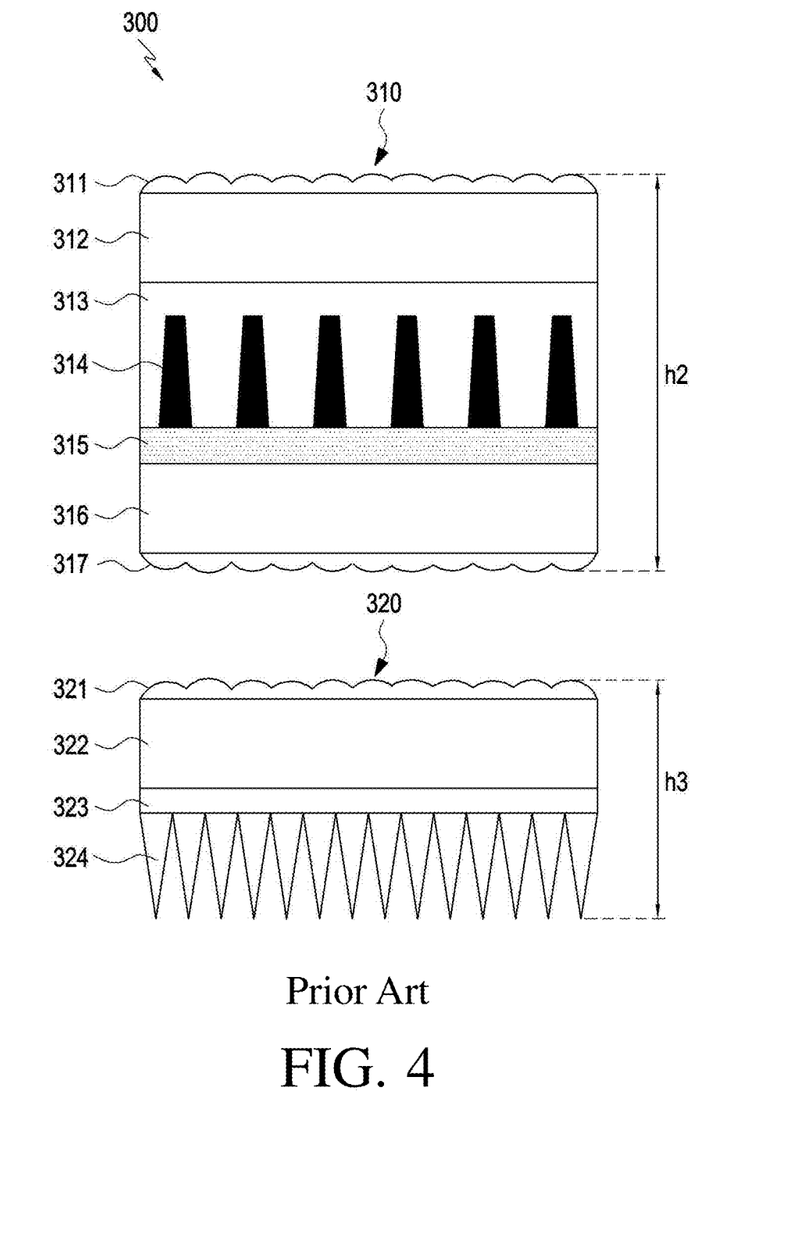
FIG. 4 is a plain view of an optical film for explaining the problem of the prior art.

FIG. 4 is a plain view of an optical film for explaining problems of the prior art.

Figure 5:
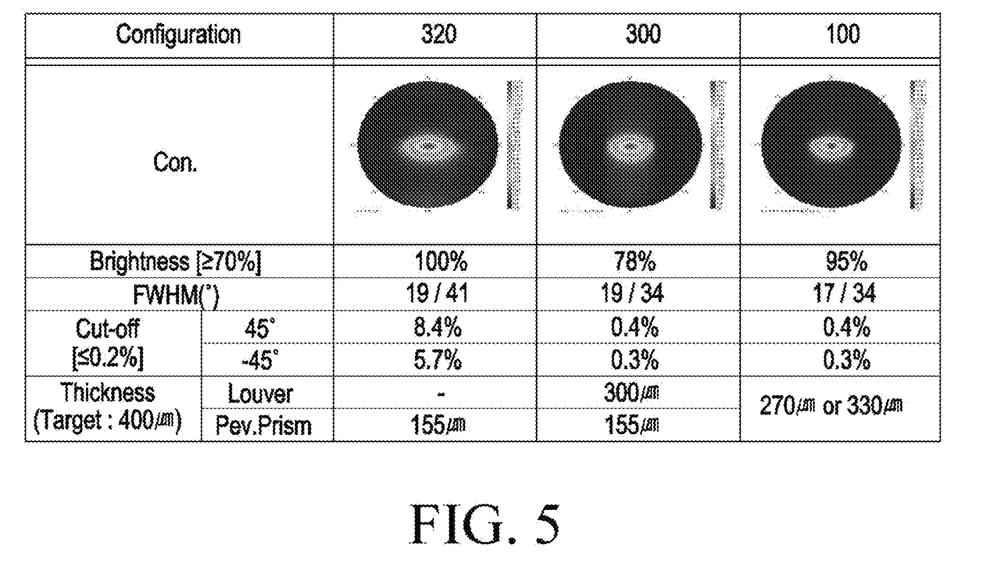
FIG. 5 is a view for explaining the difference between the optical film of the present invention and the optical film of the prior art.

FIG. 5 is a view for explaining the difference between the optical film of the present invention and the optical film of the prior art.

FIGS. 1 to 5, the optical film 100 may have higher brightness than the conventional optical film 300 and a short full width at half maximum (FWHM).

According to various embodiments, the optical film 100 may have a structure where the light blocking pattern layer 130 and the prism structure 170 are laminated. For example, the optical film 100 may include the adhesive layer 150. The adhesive layer 150 may be disposed between the light blocking pattern layer 130 and the prism structure 170 to attach or connect the light blocking pattern layer 130 and the prism structure 170.

For example, a conventional optical film 300 may include a louver 310 and a reverse prism sheet 320. According to one embodiment, the louver 310 includes a first upper matte layer 311, an upper base film 312, a light blocking pattern layer 313, a light absorption pattern 314, an adhesive layer 315, a lower base film 316 and a lower matte layer 317. The configuration of the first upper matte layer 311, the upper base film 312, the light blocking pattern layer 313, the light absorption pattern 314 and the adhesive layer 315 of the louver 310 can be entirely or partially the same as the configuration of the matte layer 110, the first base film 120, the light blocking pattern layer 130, the light absorption pattern 140 and the adhesive layer 150 of the optical film 100 of FIGS. 2 and 3.

According to one embodiment, the reverse prism sheet 320 may include a second upper matte layer 321, a prism base film 322, a prism structure 323 and a prism 324. The configuration of the prism base film 322, the prism structure 323, and the prism 324 of the reverse prism sheet 320 may be entirely or partially the same as the configuration of the second base film 160, the prism structure 170 and the prism 171 of the optical film 100 of FIGS. 2 and 3.

The optical film 100 of the present invention may be slimmer due to a one-sheet configuration comparing to a configuration where a plurality of optical sheets are simply stacked (e.g., the optical film 300 of FIG. 4).

According to various embodiments, the optical film 100 may have a first height (h1). According to an embodiment, the first height (h1) may be changed based on the thickness of the base films 120 and 160. For example, when the first base film 120 and the second base film 160 are PET with a thickness of about 50 μm, the first height (h1) of the optical film 100 may be about 270 μm. For another example, when the first base film 120 and the second base film 160 are OCF-PET having a thickness of about 80 μm, the first height (h1) of the optical film 100 may be about 330 μm. In the conventional optical film 300 in which a plurality of optical sheets are simply stacked, the louver 310 has a second height (h2) of about 300 μm, and the reverse prism sheet 320 may have a third height (h3) of about 155 μm. For example, the optical film 100 of the present invention may exclude some components (e.g., the lower base film 316 or the prism base film 322) of the conventional laminated optical film 300 because the louver 310 and the reverse prism sheet 320 are laminated.

The optical film 100 of the present invention may improve the viewing angle narrowing performance and the brightness performance compared to a structure where a plurality of optical sheets are simply stacked (e.g., the optical film 300 of FIG. 4). According to an embodiment, referring to a conoscope image of the optical film 100 of the present invention, a conoscope image of the reverse prism sheet 320 and/or a conoscope image of the conventional optical film 300, the viewing angle of the optical film 100 of the present invention may be the narrowest. According to one embodiment, the brightness of the optical film 100 of the present invention may be greater than that of the conventional optical film 300, and the full width at half maximum (FWHM) may be reduced. The conoscopic image may be referred to as a captured viewing angle image using a device for observing a moving path of light.

According to various embodiments, the cut-off viewing angle brightness of the optical film 100 may be decreased as the refractive index of the adhesive layer is increased. According to one embodiment, the cut-off viewing angle brightness of the optical film 100 of the present invention may be improved over the cut-off viewing angle brightness of the conventional optical film 300.

Figure 6:
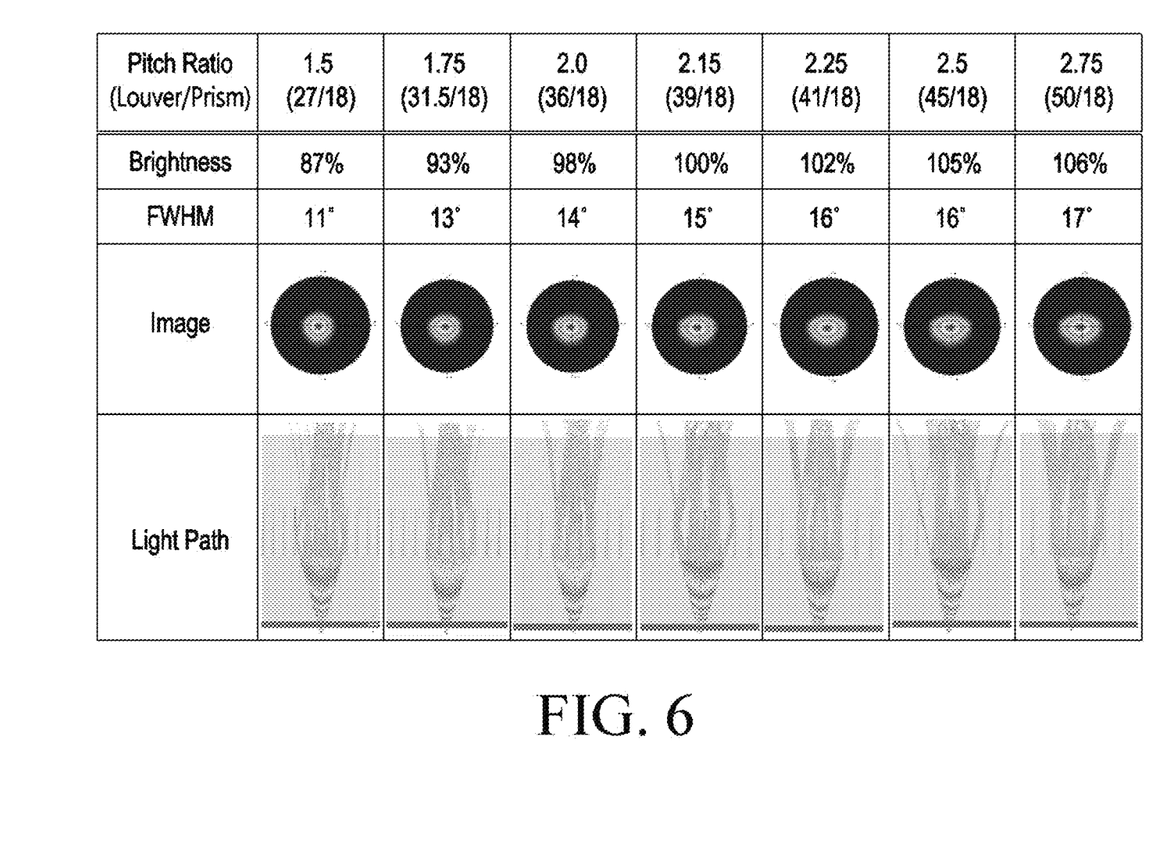
FIG. 6 is a chart for explaining an effect of an optical film with respect to a ratio of a first pitch to a second pitch, according to various embodiments of the present invention.
Figure 7:
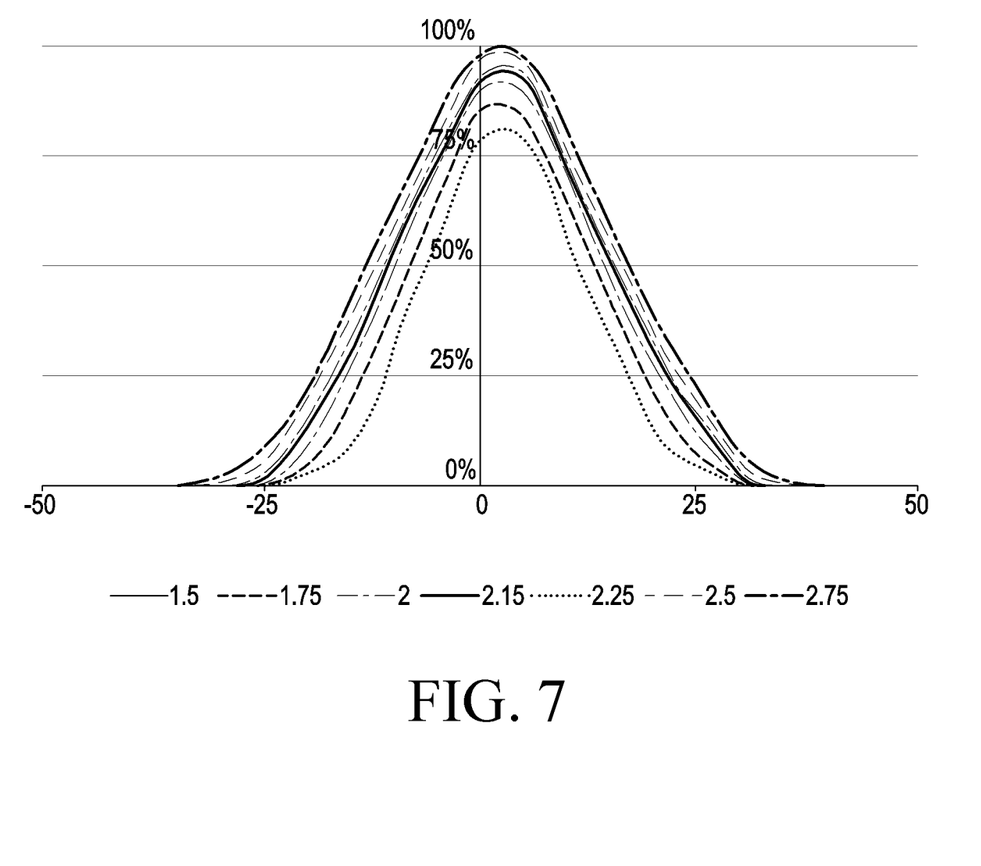
FIG. 7 is a graph for explaining the brightness with respect to a ratio of a first pitch to a second pitch, according to various embodiments of the present invention.

FIG. 6 is a chart for explaining an effect of an optical film with respect to a ratio of a first pitch to a second pitch, according to various embodiments of the present invention. FIG. 7 is a graph for explaining the brightness with respect to a ratio of a first pitch to a second pitch, according to various embodiments of the present invention. For example, a vertical axis of FIG. 7 may mean the brightness and a horizontal axis may mean the viewing angle.

Referring to FIGS. 6 and 7, the brightness, the full width at half maximum (FWHM), the viewing angle, and/or the light path of the optical film may be changed based on the ratio of a first pitch (e.g., the first pitch (P1) of FIG. 3) of a light absorption pattern (e.g., the light absorption pattern 140 of FIG. 3) and a second pitch (e.g., the second pitch (P2) in FIG. 2) of a prism (e.g., the prism 171 of FIG. 2). According to an embodiment, as the brightness is increased, the privacy function may be decreased. For example, when the brightness is increased, the full width at half maximum (FWHM) is increased so that the privacy function may be reduced.

According to various embodiments, the optical film may have pitches (P1, P2) having a full width at half maximum (FWHM) for a privacy function while maintaining brightness for user convenience. According to an embodiment, as the length of the first pitch (P1) relative to the second pitch (P2) is increased, the brightness and full width at half maximum (FWHM) may be increased. According to an embodiment, the ratio of the first pitch (P1) to the second pitch P2 may be 1.5 to 2.75. More preferably, the first pitch (P1) may be 2 to 2.5 times of the second pitch (P2). For example, the first pitch (P1) may be 27 μm to 50 μm. The second pitch (P2) may be about 18 μm. According to one embodiment, the first pitch (P1) may be about 2.15 times of the second pitch (P2).

Figure 8:
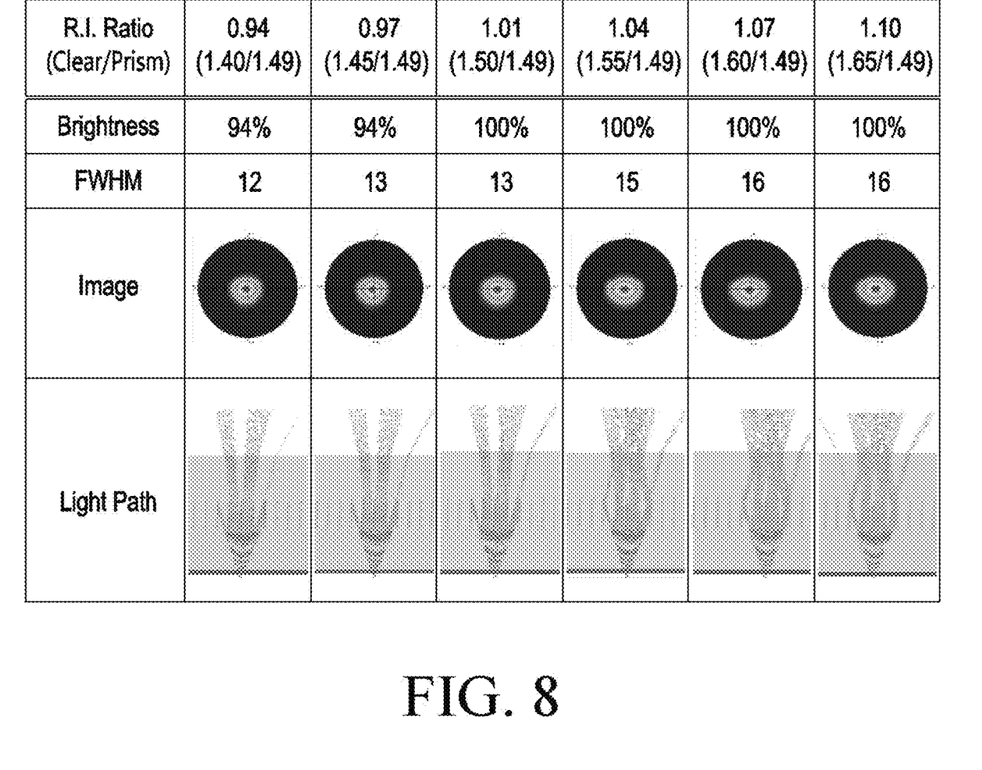
FIG. 8 is a chart for explaining an effect of an optical film with respect to a relative ratio of refractive index according to various embodiments of the present invention.
Figure 9:
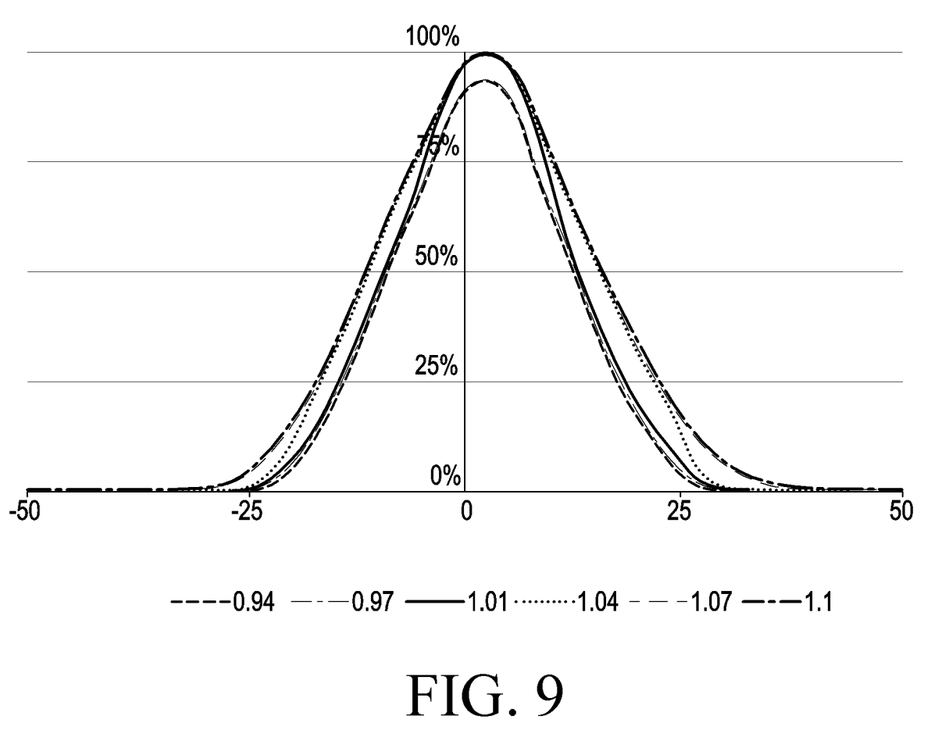
FIG. 9 is a graph for explaining the brightness of an optical film with respect to a relative ratio of refractive index according to various embodiments of the present invention.

FIG. 8 is a chart for explaining an effect of an optical film with respect to a relative ratio of refractive index according to various embodiments of the present invention. FIG. 9 is a graph for explaining the brightness of an optical film with respect to a relative ratio of refractive index according to various embodiments of the present invention. For example, a vertical axis of FIG. 9 may mean the brightness and a horizontal axis may mean the viewing angle.

FIGS. 8 and 9, the brightness, the full width at half maximum (FWHM), the viewing angle, and/or the light path of the optical film may be changed based on the ratio of a first refractive index (clear) of the light blocking pattern layer 130 and a second refractive index (prism) of the prism structure (e.g., the prism structure 170 of FIG. 2). According to an embodiment, as the brightness is increased, the full width at half maximum (FWHM) is increased so that the privacy function may be reduced. For example, the full width at half maximum (FWHM) and the brightness may have a trade-off relationship.

According to various embodiments, the optical film may have a refractive index having a full width at half maximum (FWHM) for a privacy function while maintaining brightness for a user convenience. According to an embodiment, as the first refractive index of the light blocking pattern layer 130 is increased with respect to the second refractive index of the prism structure 170, the brightness and the full width at half maximum (FWHM) may be increased. According to an embodiment, as the first refractive index of the light blocking pattern layer 130 is increased within a certain range, the brightness may be the same, but the full width at half maximum (FWHM) is increased, and thus the privacy function may be reduced.

According to one embodiment, the ratio of the first refractive index to the second refractive index may be 0.9 to 1.1. For example, the first refractive index of the light blocking pattern layer 130 may be about 1.40 to about 1.65 and the second refractive index of the prism structure 170 may be about 1.49. According to an embodiment, the first refractive index of the light blocking pattern layer 130 may be about 1.04 of the second refractive index of the prism structure 170.

Figure 10:
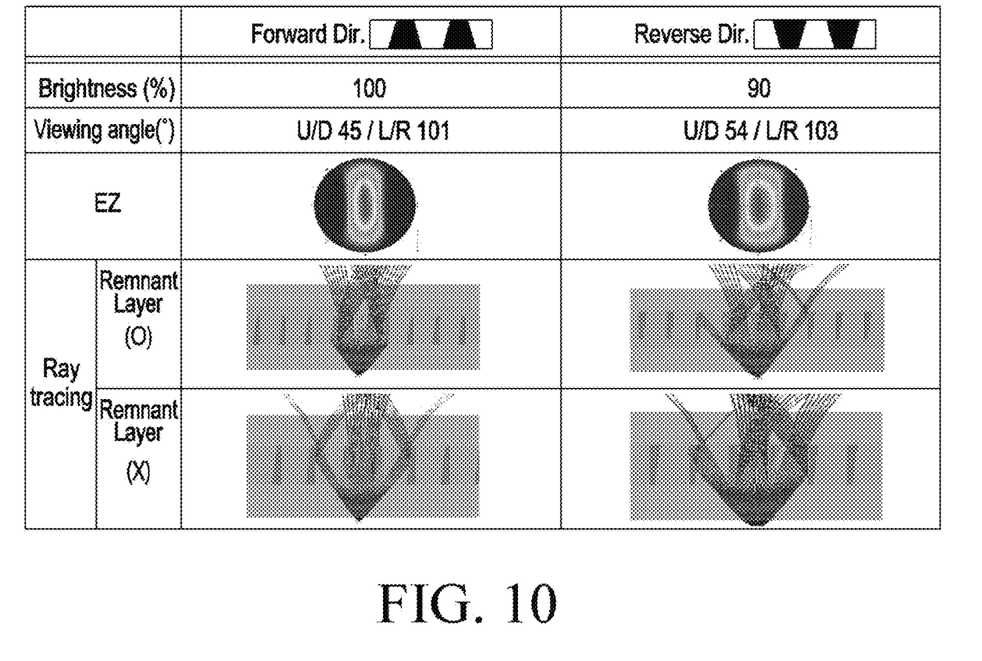
FIG. 10 is a view for explaining an effect of an optical film according to a shape of a light absorption pattern of the present invention.

FIG. 10 is a view for explaining an effect of an optical film according to a shape of a light absorption pattern of the present invention.

Referring to FIG. 10, an optical film of the present invention (e.g., the optical film 100 of FIG. 1) may have a positive trapezoidal light absorption pattern (e.g., the light absorption pattern 140 of FIG. 3). For example, the area of the upper surface (e.g., the upper surface 140a of FIG. 3) of the light absorption pattern 140 may be smaller than the area of the lower surface (e.g., the lower surface 140b of FIG. 3). According to an embodiment, the brightness of the optical film of the present invention including the light absorption pattern 140 in the forward direction (e.g., the optical film 100 of FIG. 1) may be higher than the brightness of the optical film including the light absorption pattern in the reverse direction.

According to an embodiment, the viewing angle of the optical film of the present invention including the light absorption pattern 140 in a forward direction (e.g., the optical film 100 of FIG. 1) may be narrower than that of the optical film including the light absorption pattern in a reverse direction.

According to various embodiments of the present invention, an optical film (e.g., the optical film 100 of FIG. 1) may comprise a matte layer (e.g., the matte layer 110 of FIG. 1) including a plurality of protrusions (e.g., the protrusion 111 of FIG. 2), a first base film disposed under the matte layer (e.g., the first base film 120 of FIG. 1), a light blocking pattern layer (e.g., the light blocking pattern layer 130 of FIG. 1) disposed under the first base film and including a plurality of light absorption patterns (e.g., the light absorption pattern 140 of FIG. 1) arranged along a first direction (e.g., the Y-axis direction of FIG. 1), an adhesive layer (e.g., the adhesive layer 150 of FIG. 1) disposed under the light blocking pattern layer, and a second base film (e.g., the second base film of FIG. 1) attached to the light blocking pattern layer using the adhesive layer 160 and a prism structure (e.g., the prism structure 170 of FIG. 1) disposed under the second base film and including a plurality of prisms (e.g., the prisms 171 of FIG. 1) arranged along a second direction inclined at 80° to 100° with respect to the first direction.

According to various embodiments, the light blocking pattern layer includes a first surface (e.g., the first surface 130a of FIG. 3) facing the first base film and a second surface (e.g., the second surface 130b in FIG. 3) opposite to the first surface and facing the adhesive layer, the light absorption pattern includes a upper surface (e.g., the upper surface 140a in FIG. 3) toward to the first surface, a lower surface (e.g., the lower surface 140b in FIG. 3) disposed on the second surface and a side surface (e.g., the side surface 140c in FIG. 3) extending from the lower surface to the upper surface where the area of the upper surface may be smaller than the area of the lower surface.

According to various embodiments, the angle between the side surface and the lower surface may be 85° to 90°.

According to various embodiments, the upper surface may be spaced apart from the first surface.

According to various embodiments, a first pitch of the plurality of light absorption patterns (e.g., the first pitch (P1) of FIG. 3) may be 2 to 2.5 times of the second pitch of the plurality of prisms (e.g., the second pitch (P2) of FIG. 3).

According to various embodiments, a prism structure may be configured to condense light incident from the bottom of the prism structure and the light blocking pattern layer may be configured to condense light incident from the bottom of the light blocking pattern layer.

According to various embodiments, the plurality of light absorption patterns may be configured to reduce a viewing angle in the second direction and the plurality of prisms may be configured to reduce a viewing angle in the first direction.

According to various embodiments, each of the plurality of light absorption patterns may have a trapezoidal wedge shape.

According to various embodiments, the plurality of light absorption patterns may be arranged parallel to each other and spaced apart from each other.

According to various embodiments, the light blocking pattern layer may include a light transmitting area (e.g., the light transmitting area 131 of FIG. 3) positioned between the plurality of light absorption patterns.

According to various embodiments, the backlight unit may include an optical film, a light source (e.g., the light source 210 of FIG. 1) and a light guide plate (the light guide plate 230 of FIG. 1) configured to transmit at least a portion of light generated from the light source to the optical film.

According to various embodiments, a display device may include a liquid crystal display (LCD) panel and a backlight unit positioned under the LCD panel.

The optical film in the present invention as stated above, the backlight unit including the optical film, and the display device including the optical film and the backlight unit may not be limited to the foregoing embodiments and drawings. The person ordinary skilled in the art to which the present invention belongs will recognize that various substitutions, modifications, and changes are possible within the technical scope of the present invention.

What is claimed is:

1. A backlight unit comprising:
   a light source for emitting a light to a first direction;
   a light guide plate wherein the light source is located at a side of the light guide plate; and
   an optical film comprising:
   a matte layer including a plurality of protrusions protruded toward to a viewing direction and disposed on a first base film;
   a light blocking pattern layer disposed under the first base film and including a plurality of light absorption patterns, wherein each of the plurality of light absorption patterns includes an upper surface facing the first base film, a lower surface opposite to the upper surface extended in a second direction which is substantially parallel to the first direction, and a side surface extending from the upper surface to the lower surface, and an area of the upper surface is smaller than an area of the lower surface;
   an adhesive layer disposed under the light blocking pattern layer, wherein the upper surface of each of the plurality of light absorption patterns in the light blocking pattern layer is spaced apart from the first base film and the lower surface of each of the plurality of light absorption patterns in the light blocking pattern layer is contacted to the adhesive layer;

a second base film attached to the light blocking pattern layer by the adhesive layer; and a prism structure disposed under the second base film and including a plurality of prisms, wherein a vertex of each of the plurality of prisms is facing opposite to the viewing direction and an edge of each of the plurality of prisms is extended in a third direction forming an angle in a range of 80° to 100° with respect to the first direction and the second direction.

2. The backlight unit of claim 1, wherein each of the plurality of light absorption patterns of the optical film has an angle of 85° to 90° between the side surface and the lower surface.

3. The backlight unit of claim 1, wherein the first pitch of the plurality of light absorption patterns of the optical film is 2 to 2.5 times of the second pitch of the plurality of prisms.

4. The backlight unit of claim 1, wherein the plurality of light absorption patterns of the optical film are configured to reduce a viewing angle in the second direction and the plurality of prisms are configured to reduce a viewing angle in the first direction.

5. The backlight unit of claim 1, wherein each of the plurality of light absorption patterns of the optical film has a trapezoidal wedge shape.

6. The backlight unit of claim 1, wherein the plurality of light absorption patterns of the optical film are arranged parallel to each other and spaced apart from each other.

7. The backlight unit of claim 1, wherein the light blocking pattern layer of the optical film includes a light transmitting area positioned between the plurality of light absorption patterns.

* * * * *